(12) United States Patent
Furuhata

(10) Patent No.: US 6,345,897 B1
(45) Date of Patent: Feb. 12, 2002

(54) PROJECTION DISPLAY DEVICE AND REMOTE CONTROLLER

(75) Inventor: Mutsuya Furuhata, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/280,810

(22) Filed: Mar. 30, 1999

(30) Foreign Application Priority Data

Apr. 9, 1998 (JP) ............................................ 10-098009
Apr. 9, 1998 (JP) ............................................ 10-098010

(51) Int. Cl.[7] ............................................... G03B 21/00

(52) U.S. Cl. ..................................................... 353/122

(58) Field of Search .......................... 353/42, 101, 122; 345/169, 184, 970; 348/14.05; 359/142, 146, 148

(56) References Cited

U.S. PATENT DOCUMENTS

| 5,408,284 | A | * | 4/1995 | Berger et al. ................ 353/103 |
| 5,550,604 | A | * | 8/1996 | Gale et al. ...................... 353/31 |
| 5,743,614 | A | * | 4/1998 | Salerno et al. ............... 353/122 |
| 5,782,548 | A | * | 7/1998 | Miyashita ...................... 353/42 |
| 5,877,747 | A | * | 3/1999 | Kitao et al. .................. 345/160 |
| 6,186,630 | B1 | * | 2/2001 | Miyashita ...................... 353/42 |

* cited by examiner

Primary Examiner—William Dowling
(74) Attorney, Agent, or Firm—Oliff & Berridge PLC

(57) ABSTRACT

In a projection display device which can be controlled by a remote controller, the remote controller includes a power supply switch button for turning on/off a power supply at a body of the projection display device, a zoom adjuster button for adjusting the zooming of a projection lens, and a focus adjuster button for adjusting the focusing of the projection lens. The projection display device body includes a restricting system which can restrict the adjusting functions of these buttons, so that inadvertent operation of any of these buttons does not affect the projection display device.

23 Claims, 13 Drawing Sheets

PROJECTION DISPLAY DEVICE AND REMOTE CONTROLLER

BACKGROUND OF THE INVENTION

1. Field of Invention

The present invention relates to a projection display device, controllable by a remote controller, which comprises a light source, an optical system for forming an optical image in accordance with image information as a result of optically processing light beams emitted from the light source, a projection lens for projecting the optical image in enlarged form, and a remote controller for controlling the projection display device.

2. Description of Related Art

A hitherto known projection display device, which can be controlled by a remote controller, includes a light source, an optical system for forming an optical image in accordance with image information as a result of optically processing light beams emitted from the light source, and a projection lens for projecting the optical image in enlarged form.

Such a projection display device is used in front of many people, for example, of academic societies, or at conferences or exhibitions. When, for example, a computer is connected to the projection display device in order to display the image on the computer in enlarged form, multimedia presentations can be performed. The presenter explains what is on the display screen by operating a remote controller. The remote controller includes various buttons, for example, that a laser pointer button used for specifying the location where the information or image to be explained is displayed on the display screen; a pointer operation button for operating a mouse pointer on the computer; and various adjuster buttons for adjusting the display screen according to the circumstances, such as a zoom adjuster button, a focus adjuster button, a power supply switch button, and an image adjuster button.

However, when a presenter explains what is on the display screen using such a remote controller, the presenter explains it primarily by looking at the display screen, so that he may inadvertently press an incorrect adjuster button. Therefore, it is desirable to restrict the functions that can be adjusted by the use of the remote controller to the minimum number required, so that even when a button is pressed an unnecessary function is not executed.

When there is more than one person making presentations for academic societies or at exhibitions, the zooming adjusting function and the focusing adjusting function are rarely adjusted again, once they are set. Therefore, it is desirable to restrict the zooming adjusting function and the focusing adjusting function so that incorrect operations of the zoom adjust button and the focus adjuster button do not occur.

Similarly with the remote controller, the above-described projection display device has a body side power supply switch button, for turning on/off the switches of the projection display device, and buttons for adjusting what is on the display screen, that is a body side zoom adjuster button, a body side focus adjuster button, a body side image adjuster button, and the like. When explaining what is on the display screen by using a remote controller, it may be better to restrict the body side adjusting functions in order to prevent an outsider from incorrectly operating the control.

SUMMARY OF THE INVENTION

Accordingly, it is an object of the present invention to provide a projection display device and a remote controller which are not affected even when an outsider incorrectly operates any one of the adjuster buttons on the remote controller or on the projection display device body.

To this end, according to an aspect of the present invention, there is provided a projection display device controllable by a remote controller, the projection display device including a light source, an optical system for forming an optical image in accordance with image information as a result of optically processing light beams emitted from the light source, and a projection lens for projecting the optical image in enlarged form, the projection display device comprising a power supply switch restricting system for restricting a function of a power supply switch portion of the remote controller which causes a power supply to be turned on/off.

Here, a conventionally known type of circuit may be used for the power supply switch restricting system. The conventionally known type circuit does not receive a signal, which is provided from the remote controller in order to turn the power supply switch on or off, even when such a signal is input into the projection display device.

For example, the power supply switch restricting system can be formed by a circuit including a switching element which electrically connects or disconnects the light-receiving portion for receiving light from the remote controller with the power supply switching circuit of the projection display device. In another example, the power supply switch restricting system can be formed such that the type of light signal that the light-receiving portion receives from the remote controller can be selected at a signal processing circuit forming the light receiving portion.

According to this aspect, the power supply device is provided with a power supply switch restricting system which can restrict a function of the power supply switch portion on the remote controller. Therefore, when this function of the remote controller is controlled, the power supply of the projection display device will not be cut off, even when the presenter using the projection display device inadvertently operates the power supply switch portion on the remote controller incorrectly.

In this aspect, switching between the restricting states of the power supply switch restricting system may be performed by (a) using a setting screen displaying system, which is provided at the body of the projection display device, in order to show a setting screen used to set the projection display device, and performing selection of menu on the setting screen, or by (b) using a switch, which is provided at the body of the projection display device, and specifically designed for switching the restricting state of the power supply switch restricting system.

When switching between the restricting states is performed using a setting screen in the projection display device, the restricting state can be displayed on the screen, so that the setting of the restricting state of the remote controller can be confirmed by more than one person. In case that restricting is performed using a specifically designed switch, if the restricting state of the power supply switch restricting system is set at the projection display device body, the restricting state cannot be switched using the remote controller. Therefore, even when the remote controller is used by a large and an unspecified number of persons, such as while making a presentation for an academic society, confusion owing to the accidental changes of the restricting state will not arise.

According to another aspect of the present invention, there is provided a projection display device controllable by a remote controller, the projection display device including a light source, an optical system for forming an optical image in accordance with image information as a result of optically processing light beams emitted from the light source, and a projection lens for projecting the optical image in enlarged form, the projection display device comprising a zooming/focusing adjusting function restricting system for restricting a function of a zooming adjusting portion, for performing zooming adjustments on the projection lens, of the remote controller, and/or for restricting a function of a focusing adjusting portion, for performing focusing adjustments on the projection lens, of the remote controller.

According to this aspect, the zooming/focusing adjusting function restricting system allows the function of the zooming adjusting portion and/or the function of the focusing adjusting portion to be restricted, so that, as in the case where the power supply switch restricting system is used, when the zooming adjusting portion function and/or the focusing adjusting portion function is restricted, the screen display will remain correctly zoomed and focused, even when a person making a presentation inadvertently operates the remote controller incorrectly. In addition, since at least one of the zooming function and the focusing function can be restricted, the person making the presentation can set the appropriate restricting state as required, for example, restriction is required only for the zooming function, thereby allowing him to set the remote controller more freely.

In this aspect, switching between the restricting states of the zooming/focusing adjusting function restricting system can be performed by the aforementioned methods (a) and (b), and the same effects as mentioned above can be obtained. In addition, switching between the restricting states can be achieved by method (c) operating at the same time the body side zooming adjusting portion or the body side focusing adjusting portion, both of which are provided at the body of the projection display device, and another adjusting portion.

When the projection display device is constructed in this manner to allow switching between restricting states, it is not necessary to provide at the device body a separate switch, specifically designed for switching the state of restriction of the function of the zooming adjusting portion and the state of restriction of the function of the focusing adjusting portion of the remote controller, at the device body, thereby simplifying the structure of the device body. In addition, switching between the states of restriction can be performed by simply operating the body side zooming adjusting portion or the body side focusing adjusting portion and another adjusting portion, at the same time. Thus, it is not necessary to go through the steps of calling out a setting screen and then changing the setting, which are required in the case where switching is performed at a setting screen, thereby eliminating the need for changing a setting, so that switching between restriction states can be performed quickly. Further, when the instruction for switching the state of restriction of the zooming adjusting function and/or the focusing adjusting function is not displayed on the body of the projection display device, the state of restriction can be switched by the operation using such as hidden commands, so that even when the remote controller is used by a large and an unspecified number of users, the restricting state cannot be easily changed. Therefore, when the projection display device is used at, for example, an exhibition, and someone plays around with the remote controller, the information or image of the projection display device will remain properly zoomed and focused.

According to still another aspect of the present invention, there is provided a projection display device controllable by a remote controller, the projection display device including a light source, an optical system for forming an optical image in accordance with image information as a result of optically processing light beams emitted from the light source, and a projection lens for projecting the optical image in enlarged form, the projection display device comprising an image adjusting function restricting system for restricting a function of an image adjusting portion, for adjusting the optical image, of the remote controller.

Here, the image adjusting portion causes the projected screen display to match the input image signal input to the projection display device. Adjustments are made, for example, on switching between the input systems that are, for example, inputting a composite signal from, for example, a video, and the input system for inputting a RGB signal from, for example, a computer. Adjustments are also made in the resolution, the refresh rate, the contrast, the tracking, or the like.

According to this aspect, the projection display device is provided with an image adjusting function restricting system for restricting the function of the image adjusting portion of the remote controller. Therefore, when only the RGB signal from a computer that is set at a predetermined resolution and refresh rate is input to the projection display device body, the function of the image adjusting portion can be restricted, thus making it possible to prevent the display screen from being disturbed as a result of inadvertent operation of the image adjusting portion. On the other hand, when a plurality of computers, which are set, for example, at different resolutions, are connected to the projection display device, and switching between computers is to be performed while making a presentation, adjustments for obtaining appropriate setting can be made using the remote controller in accordance with a computer, by making the function of the image adjusting portion effective.

The power supply restricting system, the zooming/focusing adjusting function restricting system, or the image adjusting function restricting system, each of which is provided at the projection display device, may be provided instead at the remote controller for controlling the projection display device body. In other words, according to the present invention, there is provided a remote controller for controlling the projection display device body comprising a light source, an optical system for forming an optical image in accordance with image information as a result of optically processing light beams emitted from the light source, and a projection lens for projecting the optical image in enlarged form. The remote controller may comprise at least one of the power supply switching restricting system, the zooming/focusing adjusting function restricting system, and the image adjusting function restricting system. In these restricting systems, any one of the switching methods described in the above (a) to (c) may be used.

In these restricting systems, it is possible to use conventionally known types of circuits which do not allow a signal to be output from the remote controller to the projection display device even when, for example, the power supply switch portion, an adjusting portion, or the like is turned on/off. For example, each restricting system may be formed by a light signal outputting circuit for outputting a light signal from the remote controller, and a circuit including a switching element used to electrically connect or disconnect, for example, the power supply switch portion with the adjusting portions.

When any one of the above-described restricting systems is provided at the remote controller, the same operations and effects as those obtained when these restricting systems are provided at the projection display device can be obtained. In addition, if the presenter knows the operation methods very well, he can switch the restriction states as required even while making the presentation.

According to still another aspect of the present invention, there is provided a remote controller for controlling a body of a projection display device, the projection display device comprising a light source, an optical system for forming an optical image in accordance with image information as a result of optically processing light beams emitted from the light source, and a projection lens for projecting the optical image in enlarged form, the body of the projection display device comprising a body side power supply switch portion for turning on/off a power supply of the projection display device, a body side zooming adjusting portion for performing zooming adjustments on the projection lens, a body side focusing adjusting portion for performing focusing adjustments on the projection lens, a body side image adjusting portion for adjusting the optical image, and the remote controller comprises a body side adjusting function restricting system for restricting the adjusting function of at least one of the body side power supply switch portion, the body side zooming adjusting portion, the body side focusing adjusting portion, and the body side image adjusting portion.

The body side adjusting function restricting system may be constructed so that, by operating the remote controller, it can restrict all of the adjusting functions of the projection display device body that includes the body side power supply switch portion, the body side zooming adjusting portion, the body side focusing adjusting portion, and the body side image adjusting portion, or it may be constructed so that it may select and restrict a predetermined adjusting function among these adjusting functions.

In such a body side adjusting function restricting system, it is possible to utilize a conventionally known type of light signal outputting circuit, which outputs a light signal for switching a restriction state of a body side adjusting function of the remote controller. The projection display device body includes a conventionally known type of circuit including a switching element for switching over the above mentioned restriction state of a body side adjusting function in order to switch the switch by a light signal from the remote controller.

In this aspect, since the body side adjusting functions of the projection display device body can be restricted by the body side adjusting function restricting system, only if the body side adjusting function is restricted as desired, the display screen remains correctly zoomed and focused, even when an outsider incorrectly operates a body side adjusting portion while a person is making a presentation while adjusting the display screen using the remote controller.

DETAILED DESCRIPTION OF PREFERRED EMBODIMENTS

A description will now be given of an embodiment of the present invention with reference to the drawings.

(1) Overall Structure of the Projection Display Device

Figure 1:
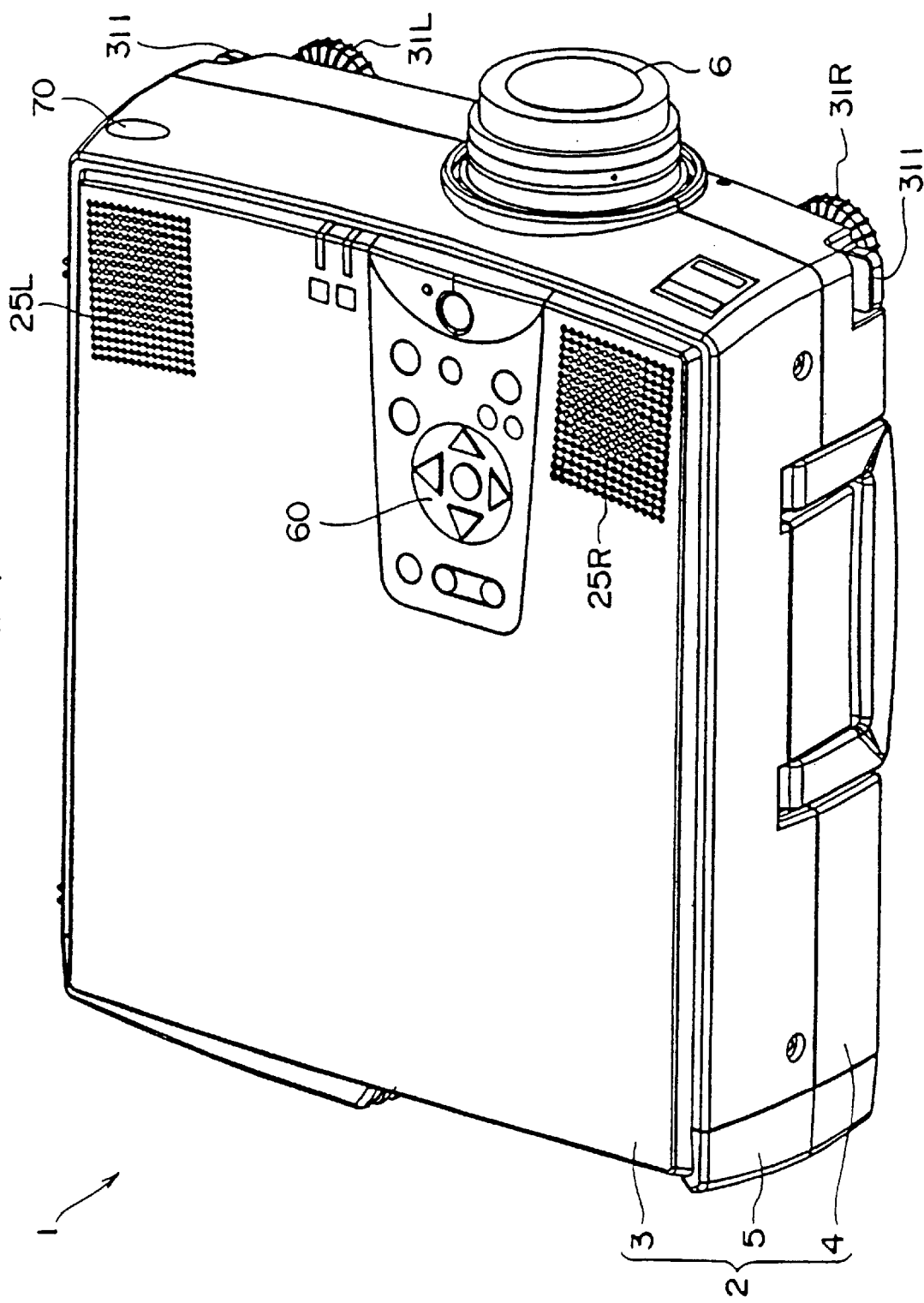
FIG. 1 is an external perspective view of an embodiment of the projection display device in accordance with the present invention, as viewed from the top side of the projection display device.
Figure 2:
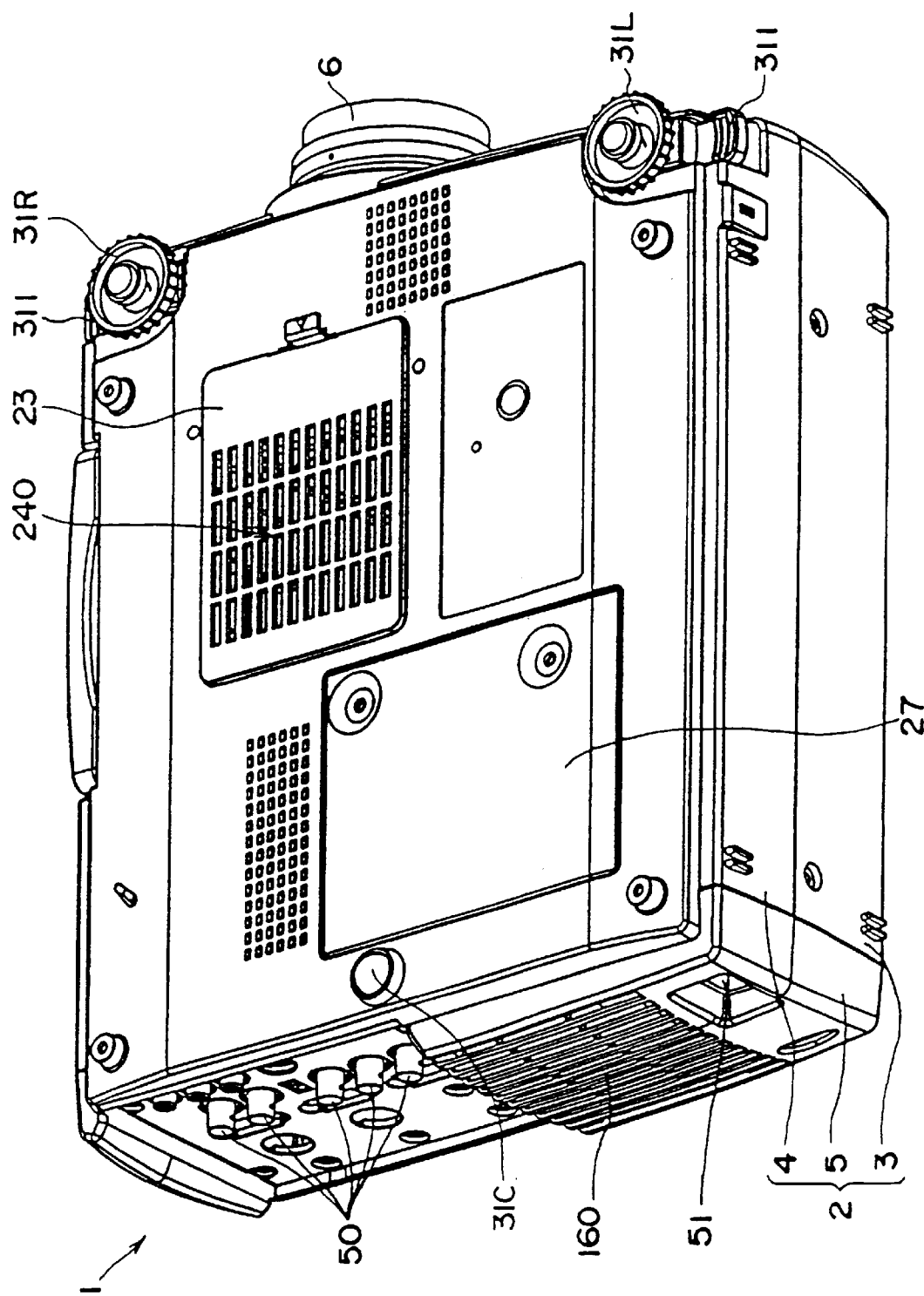
FIG. 2 is an external perspective view of an embodiment of the projection display device in accordance with the present invention, as viewed from the bottom side of the projection display device.

FIGS. 1 and 2 are schematic perspective views of a projection display device 1 of a first embodiment of the present invention. FIG. 1 illustrates the projection display device 1, as viewed from the top thereof, while FIG. 2 illustrates the projection display device 1, as viewed from the bottom thereof.

In the projection display device 1, the light emitted from a lamp, which is a light source, is separated into the three primary color light beams, the red light beam (R), the green light beam (G), and the blue light beam (B). These color light beams pass through their respective light valves (comprising a modulating system), and are modulated in accordance with image information corresponding thereto. The modulated color light beams are combined by a prism (a color-combining optical system), and the combined color light beams pass through a projection lens 6 in order to be projected onto a projection surface in enlarged form. The component parts of an optical unit 10, other than the projection lens 6, are stored in an outside case 2.

(2) Structure of the Outside Case

The outside case 2 basically comprises an upper case portion 3, which covers the top side of the projection display device 1; a lower case portion 4 which constitutes the bottom side of the projection display device 1; and a rear case portion 5 which covers the rear side of the projection display device 1.

As shown in FIG. 1, a plurality of communicating holes 25L and 25R are formed in the left and right sides of the front portion of the top surface of the upper case 3. An operation switch 60, for adjusting the quality and focus of the image displayed in the projection display device 1, is provided at substantially the center portion of the top surface of the upper case 3. A light receiver 70, for receiving a light signal emitted from a remote controller 80 (described later), is provided at the right top end of the front face of the upper case 3.

As shown in FIG. 2, at the bottom surface of the lower case 4 are provided a cover 27 for allowing replacement of a lamp unit 8 (described later) stored in the projection display device 1; and an air filter cover 23 with air intake openings 240 for cooling the interior of the projection display device 1.

As shown in FIG. 2, feet 31R and 31L are provided at the left and right corners of the front end of the bottom surface of the lower case 4; and a foot 31C is provided at substantially the center portion of the rear end of the bottom surface of the lower case 4. When the lever 311 is raised upward, feet 31R and 31L can move freely either forward or backward in the direction in which they protrude, thereby allowing the vertical position of the display screen which appears on a projection surface to be varied.

As shown in FIG. 2, at the right side of the rear case 5 is disposed an AC inlet 51 for supplying thereto external electrical power from an outside device. In addition, at the rear case 5 are disposed a terminal group 50 consisting of various input/output terminals, and an air outlet 160, which is provided adjacent to the terminal group 50 in order to allow the interior air of the projection display device to be discharged.

(3) Internal Structure of the Projection Display Device

Figure 3:
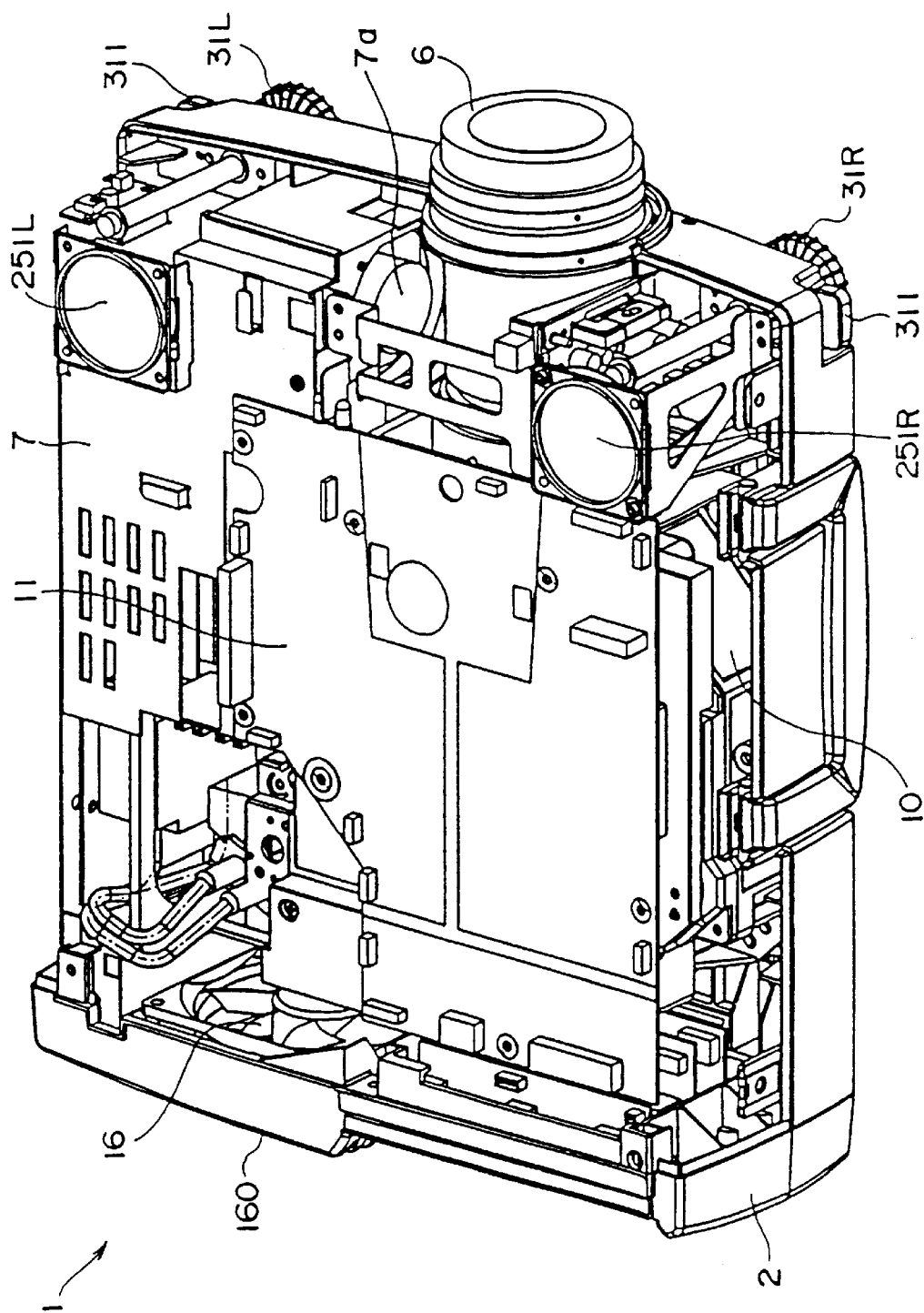
FIG. 3 is a perspective view of the internal structure of the projection display device of an embodiment in accordance with the present invention.
Figure 4:
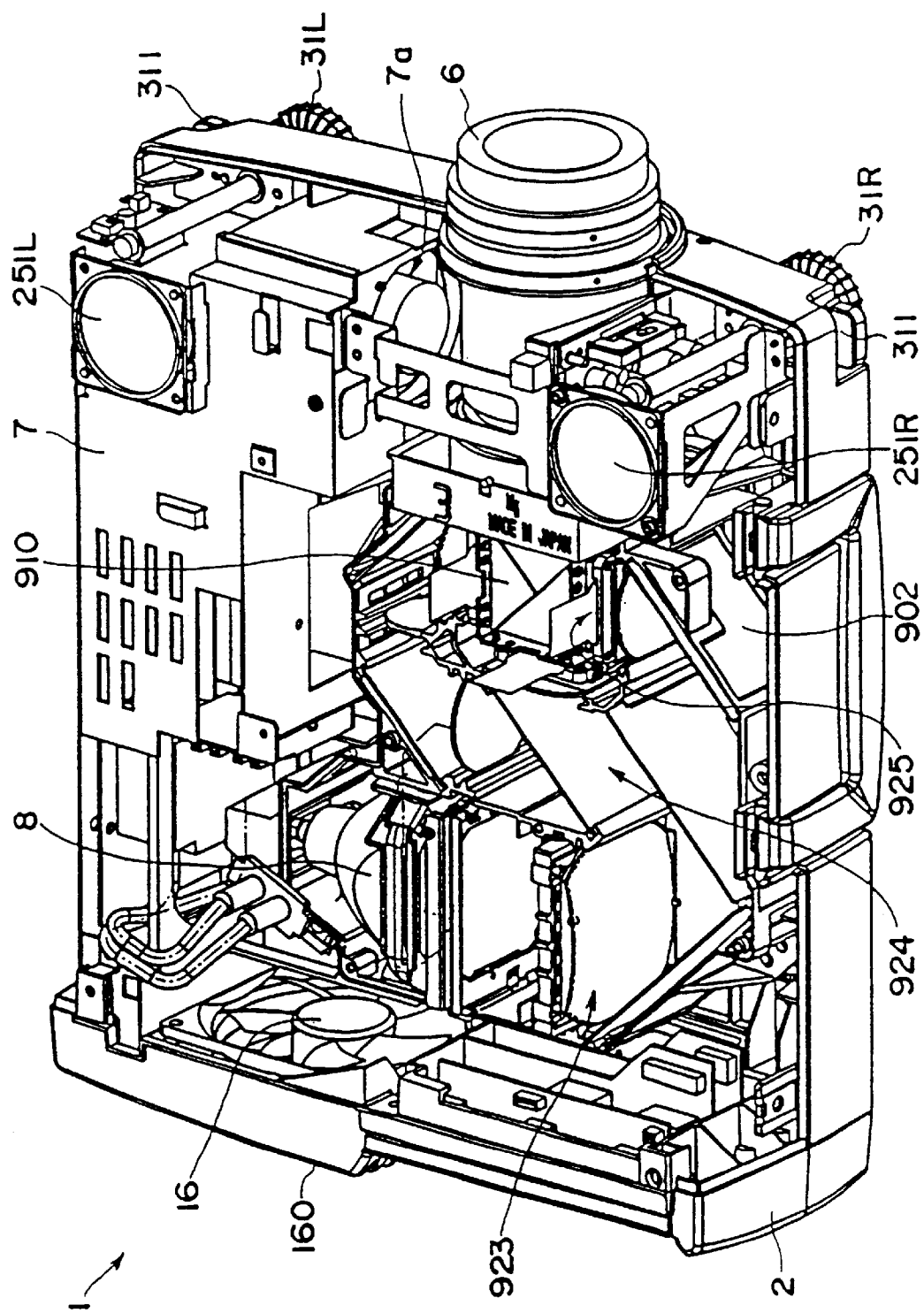
FIG. 4 is a perspective view of an optical system in the interior of the projection display device of an embodiment in accordance with the present invention.
Figure 5:
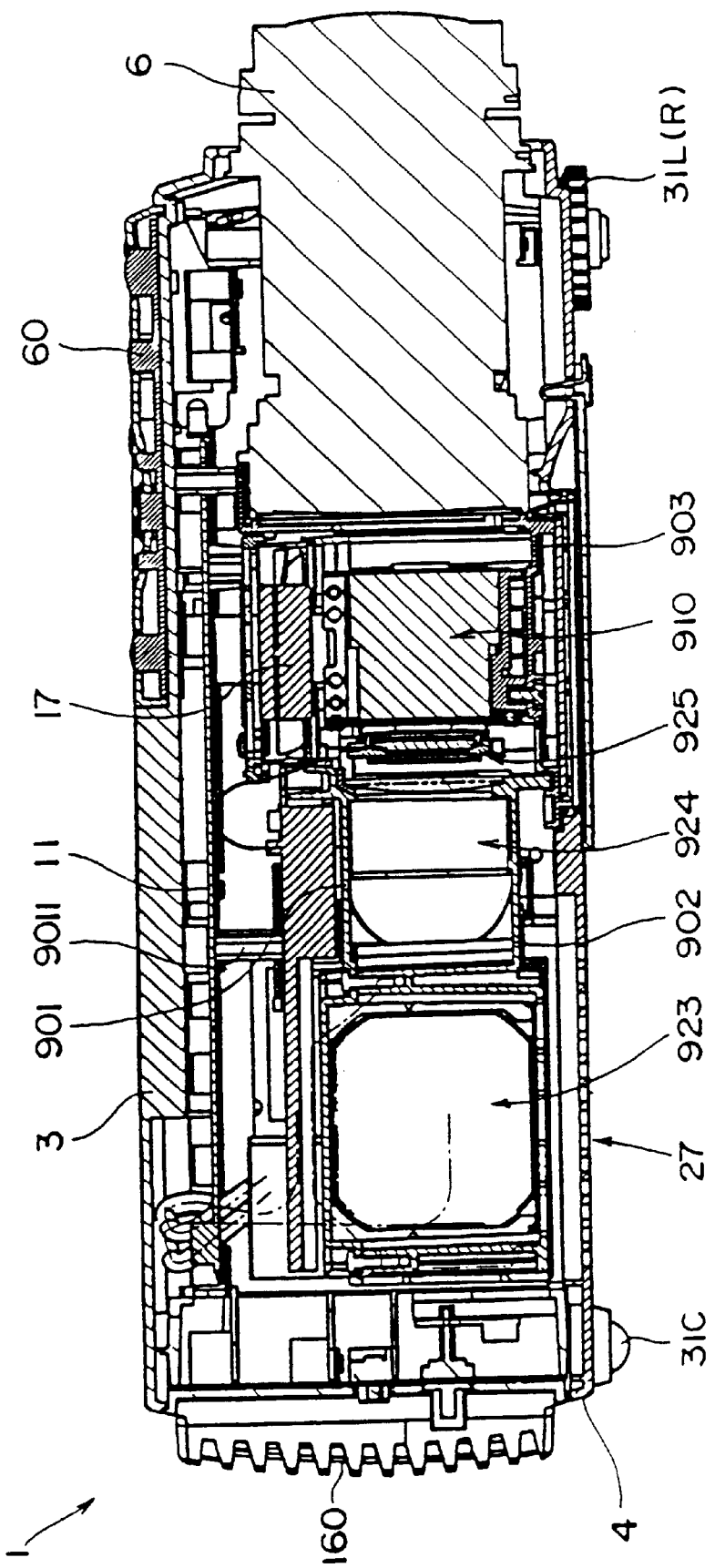
FIG. 5 is a vertical sectional view of the internal structure of the projection display device of an embodiment in accordance with the present invention.

FIGS. 3 thorough 6 shows the internal structure of the projection display device 1. FIGS. 3 and 4 are schematic perspective views of the internal structure of the projection display device 1; and FIG. 5 is a vertical sectional view of projection display device 1.

As shown in these figures, a light source lamp unit 8, an optical unit 10 constituting an optical system, a circuit board 11, and a power supply unit 7 are disposed in the outside case 2.

The light source lamp unit 8 serves as a light source section of the projection display device 1. Although not shown in the figures, the light source lamp unit 8 comprises a light source, consisting of a light source lamp and a reflector, and a lamp housing for storing the light source therein. The entire light source lamp unit 8 can be taken out by opening the aforementioned cover 27.

The optical unit 10, which forms an optical image by optically processing light beams emitted from the light source lamp unit 8 in accordance with image information, comprises an illuminating optical system 923, a color-separating optical system 924, a modulating system 925, and a prism unit 910 serving as a color-combining optical system. The optical component parts of the optical unit 10 other than the modulating system 925 and the prism unit 910 are interposed and supported between an upper light guide 901 and a lower light guide 902. The upper light guide 901 and the lower light guide 902 are secured to the lower case 4 side by a screw. Further the upper light guide 901 and the lower light guide 902 are similarly fixed to the prism unit 910 side by a screw.

Figure 6:
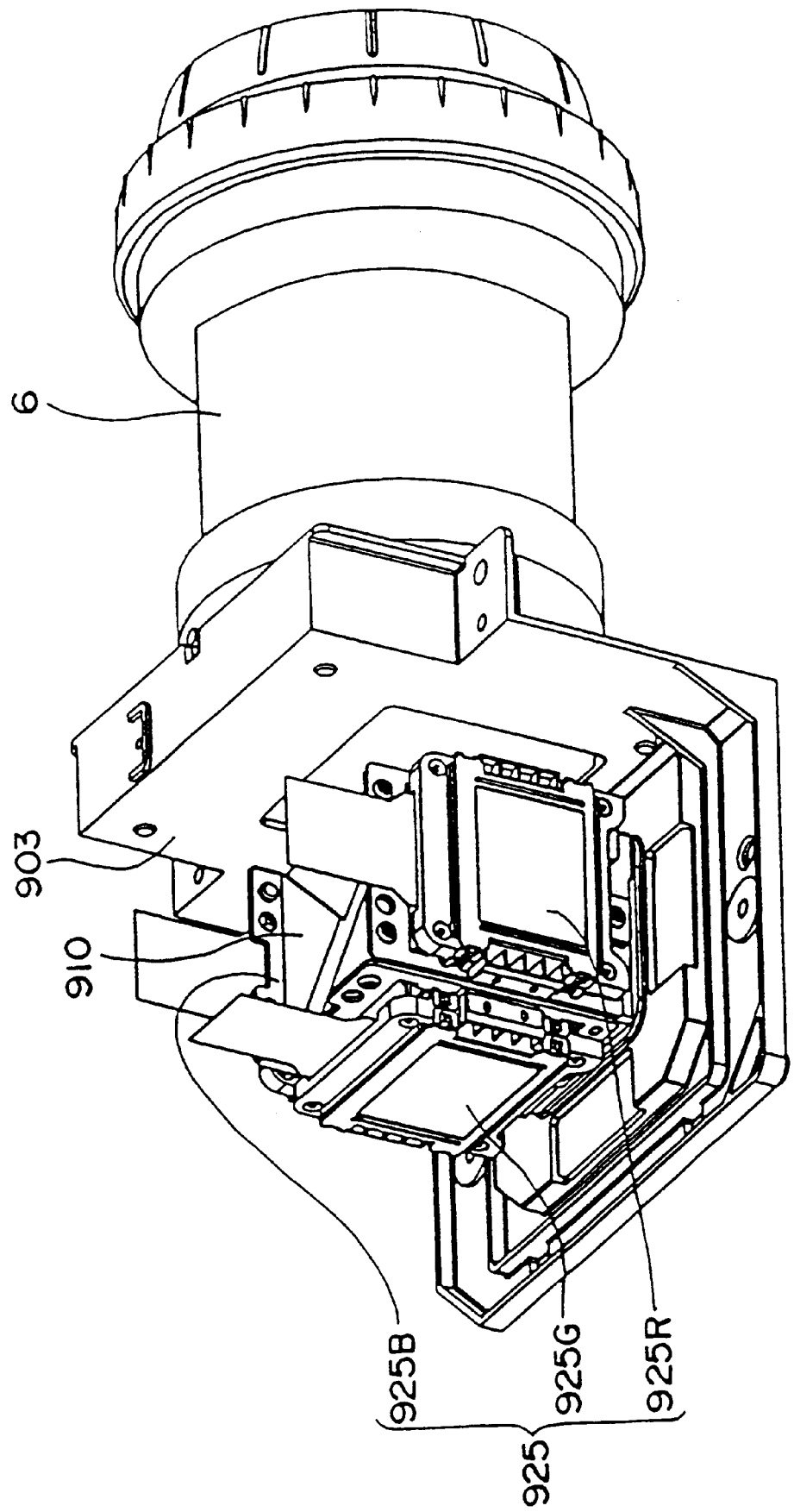
FIG. 6 is an external perspective view of a modulating system, a color-combining optical system, and a projection lens, used in an embodiment of the projection display device in accordance with the present invention.

As shown in FIG. 6, the rectangular parallelepiped prism unit 910 is secured, using a screw, to the back face of a head plate 903, being an integrally molded product of magnesium and constructed so as to have substantially L shaped faces. Color light valves 925R, 925G, and 925B, comprising the modulating system 925, are secured to the prism unit 910 so as to oppose the three side surfaces of the prism unit 910. The base end of the projection lens 6 is secured to the front face of the head plate 903 with a screw. Accordingly, as shown in FIG. 5, the head plate 903 to which the prism unit 910, the modulating system 925, and the projecting lens 6 are mounted are secured to the lower case 4 with a screw.

The circuit board 11 is provided to control the aforementioned light source lamp, the liquid crystal light valves 925R, 925G, and 925B, and the like. As shown in FIGS. 3 to 5, the circuit board 11 is disposed above the optical unit 10, and is electrically connected to the operation switch 60, which is provided at the upper case 3, at the front end portion of the projection display device 1. It is also electrically connected to the terminal group 50, which is provided at the rear case 5, at the rear end of the projection display device 1. A rod-shaped protrusion 9011 is formed above the upper light guide 901, upon which the circuit board 11 is provided. A predetermined gap is formed between the circuit board 11 and the upper light guide 901 in order to allow circulation of cooling air along the circuit board 11.

The power supply unit 7, which supplies electrical power for the optical unit 10 and the light source lamp unit 8, is disposed at a side of the optical unit 10, and is electrically connected, at the rear end of the projection display device 1, to the AC inlet 51 at the rear case 5. The power supply unit 7 also supplies electrical power to the voice output speakers 251R and 251L which are disposed in correspondence with the locations of the communicating holes 25R and 25L in the upper case 3, respectively; to a ventilating fan 16 which is provided adjacent to the light source lamp unit 8; and to an intake fan 17 provided above the prism unit 910 (described later) and taking in cooling air from the air intake openings 240. An intake fan 7a is provided at a side face which is opposite to the projection lens 6 of the power supply unit 7.

(4) Structure of the Optical System

Figure 7:
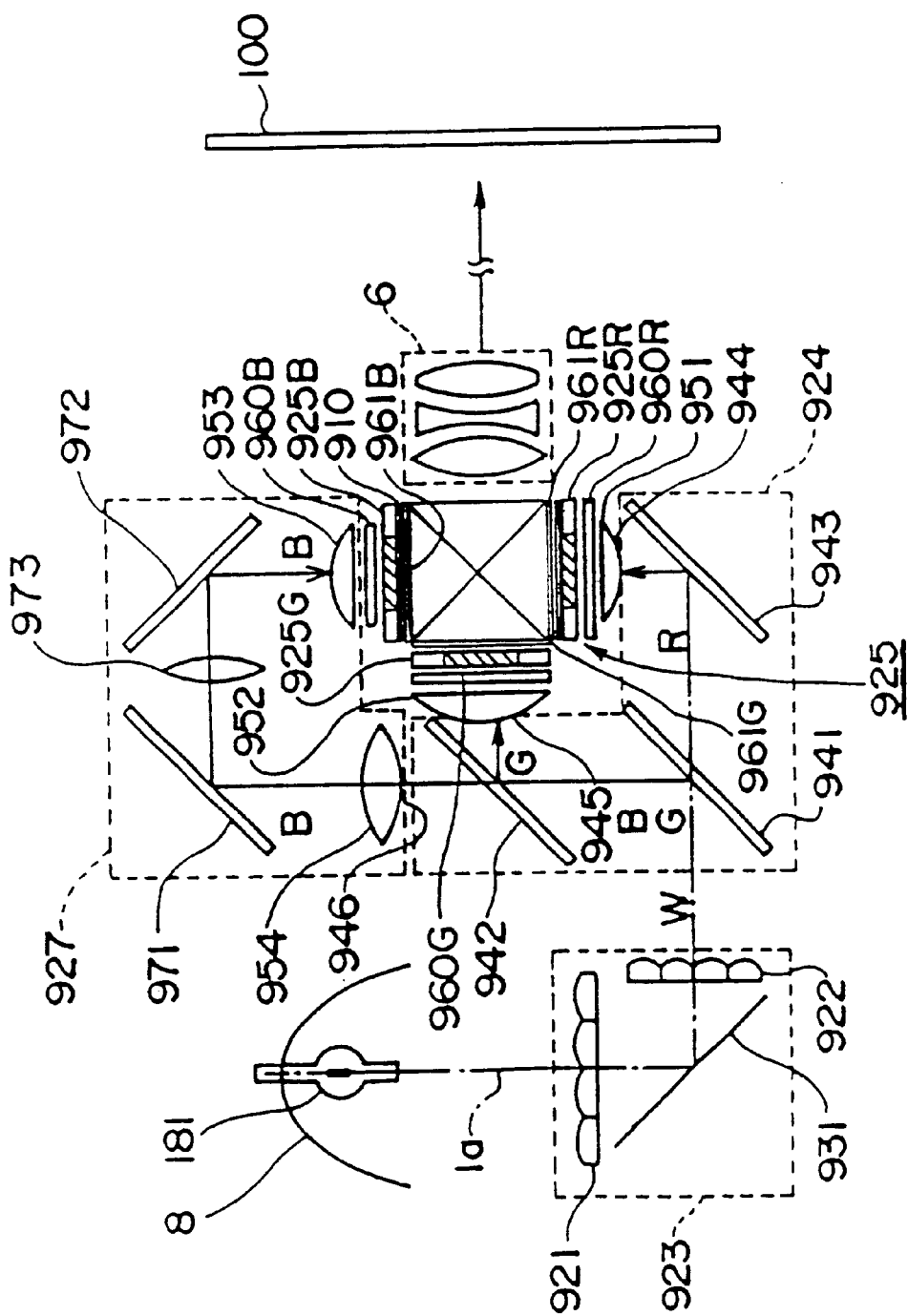
FIG. 7 is a schematic view of the structure of the optical system of the projection display device of an embodiment in accordance with the present invention.

A description will now be given of the structure of the optical system of the projection display device 1, with reference to FIG. 7 that is a schematic view of the optical system.

As described above, the optical unit 10 comprises illuminating optical system 923 for making uniform the in-plane illuminance distribution of a light beam (W) emitted from the illuminating optical system 923; color-separating optical system 924 for separating the light beam emitted from the light source lamp unit 8 into a red light beam (R), a green light beam (G), and a blue light beam (B); modulating system 925 for modulating each of the color light beams, that is the red light beam (R), the green light beam (G), and the blue light beam (B) in accordance with image information corresponding thereto; and prism unit 910 which serves as a color-combining optical system for combining each of the modulated color light beams.

The illuminating optical system 923 includes a reflecting mirror 931 for bending an optical axis 1a of the light beam W emitted from the light source lamp unit 8 so that it extends towards the front of the projection display device 1; and a first lens plate 921 and a second lens plate 922 disposed such that the reflecting mirror 931 is interposed therebetween.

The first lens plate 921 is composed of a plurality of rectangular lenses disposed in a matrix arrangement, and divides the light beam from the light source into a plurality of partial light beams and causes the light beams to be gathered and concentrated near the second lens plate 922.

The second lens plate 922 is composed of a plurality of rectangular lenses disposed in a matrix arrangement, and causes each of the partial light beams emitted from the first lens plate 921 to be superimposed on the light valves 925R, 925G, and 925B (described later) of the modulating system 925.

Accordingly, the illuminating optical system 923 can substantially uniformly illuminate the liquid crystal light valves 925R, 925G, and 925B, so that the projection display device 1 of the present embodiment can provide a projection image that does not have uneven illuminance.

The color-separating optical system 924 comprises a blue light and green light reflecting dichroic mirror 941, a green light reflecting dichroic mirror 942, and a reflecting mirror 943. At the blue light and green light reflecting dichroic mirror 941, the blue light beam (B) and the green light beam (G) of the light beam (W) that is coming from the illuminating optical system 923 are reflected at right angles and then travel towards the green light reflecting dichroic mirror 942.

The red light beam (R) passes through the blue light and green light reflecting dichroic mirror 941, is reflected at right angles by the reflecting mirror 943 disposed behind the blue light and green light reflecting dichroic mirror 941, leaves a red light (R) outgoing portion 944, and travels towards the prism unit 910. Of the blue light beam (B) and the green light beam (G) reflected by the blue light and green light reflecting dichroic mirror 941, only the green light beam (G) is reflected at right angles by the green light reflecting dichroic mirror 942, leaves a green light (G) outgoing portion 945, and travels towards the color-combining optical system. The blue light beam (B), which has passed through the green light reflecting dichroic mirror 942, leaves a blue light (B) outgoing portion 946, and travels towards a relay lens system 927. In the present embodiment, the optical system 10 is constructed such that the distances from the white light (W) outgoing portion of the illuminating optical system 923 to the light outgoing portions 944, 945, and 946 of the color-separating optical system 924 are all the same.

A light-condensing lens 951 and a light-condensing lens 952 are disposed at the red light (R) outgoing portion 944 and the green light (G) outgoing portion 945 of the color-separating optical system 924, respectively. Accordingly, the red light beam (R) and the green light beam (G), which have left their respective light-outgoing portions, enter their respective condensing lenses 951 and 952 in order to be formed into parallel light beams.

The red light beam (R) and the green light beam (G), which have been formed into parallel light beams, pass through respective light-incoming side polarizing plates 960R and 960G, and enter their respective liquid crystal light valves 925R and 925G, where they are modulated, in order to add the image information thereon corresponding to these colors. In other words, these liquid crystal light valves are controlled by switching in accordance with the image information associated thereto, by a driving means (not shown), whereby the color light beams, which pass through their respective liquid crystal light valves, are modulated. A conventionally known type of driving means can be used for such a driving means. The blue light beam (B) is led, through the relay lens system 927, to the liquid crystal light valve 925B, where it is similarly modulated in accordance with the image information corresponding thereto. For the liquid crystal light valves 925R, 925G, and 925B, a liquid crystal light valve, which utilizes a polysilicon TFT as a switching element, may be used.

The relay lens system 927 comprises a light condensing lens 954 disposed at the light-outgoing side of the blue light (B) outgoing portion 946; a light-incoming side reflecting mirror 971; a light-outgoing side reflecting mirror 972; an intermediate lens 953 disposed between these reflecting mirrors; and a light-condensing lens 973 disposed in front of the liquid crystal light valve 925B. The blue light beam (B), which has left the light-condensing lens 953, passes through a light-incoming side polarizing plate 960B, and enters the liquid crystal light valve 925B that modulates it. The length of the optical path, that is the distance from the light source lamp 181 to a liquid crystal panel, is longest for the blue light beam (B), so that the loss of blue light is largest. However, the relay lens system 927 reduces the amount of loss of blue light.

The light beams, which have been modulated as a result of passing through their respective liquid crystal light valves 925R, 925G, and 925B, pass through their respective light-outgoing side polarizing plates 961R, 961G, and 961 B, and enter the prism unit 910, where they are combined together. This results in the formation of a color image, which, through the projection lens 6, is projected in enlarged form onto a projection surface 100 disposed at a predetermined location.

(5) Structure of the Operation Switch 60

Figure 8:
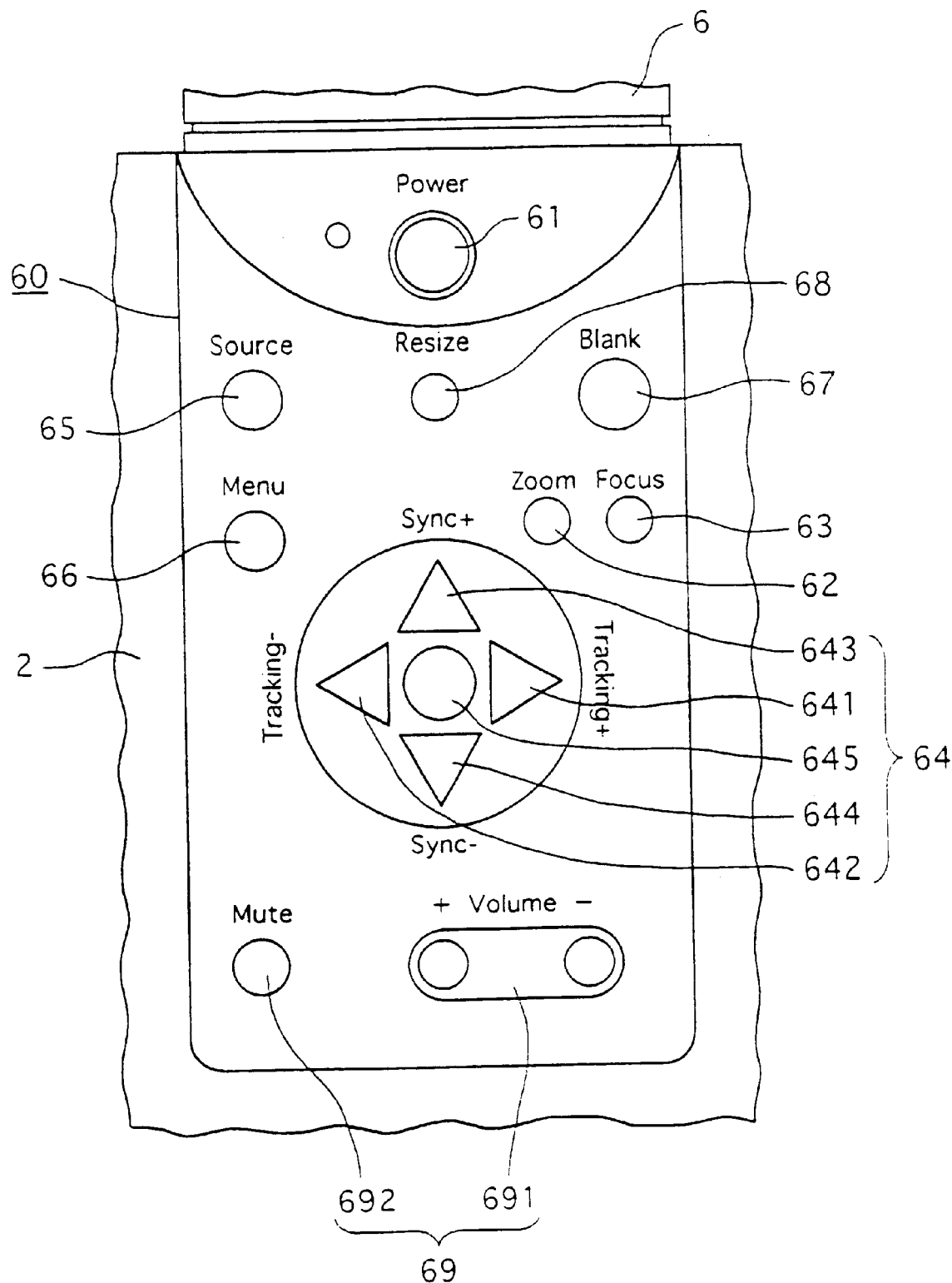
FIG. 8 is a partial front view showing the layout of the buttons of the operation switch, which is provided at the body of the projection display device, of an embodiment in accordance with the present invention.

As shown in FIG. 8, the operation switch 60, provided at the top face of the outside case 2, has a body side power supply switching button 61, a body side zoom adjuster button 62, a body side focus adjuster button 63, and a body side tracking adjusting portion 64 which comprises the image adjuster portion, and a body side input switching button 65. The body side tracking adjusting portion 64 has tracking adjuster buttons 641 and 642 for manually performing horizontal synchronization adjustments of the display screen that appears on the projection surface 100; V synchronization adjuster buttons 643 and 644 for manually performing vertical synchronization adjustments; and auto format button 645 for automatically performing these image adjustments.

In addition, the operation switch 60 has a body side menu button 66, which switches the setting screens, for setting the projection display device 1 in various ways, over the display on the projection surface 100; a body side blank button 67 for blocking an optical image to be formed based on the input image signal in order to show a blanked screen of a predetermined color; a body side re-size button 68 for adjusting the size of the display screen; and a body side voice output adjusting portion 69 for outputting a voice from the speakers 251R and 251L. The body side voice output adjusting portion 69 has a body side volume button 691, for making voice adjustments, and a body side mute button 692. As described above, such an operation switch 60 is electrically connected to the circuit board 11, which has conventionally known types of circuits used for providing each of the button functions.

(6) Structure of the Remote Controller 80

Figure 9:
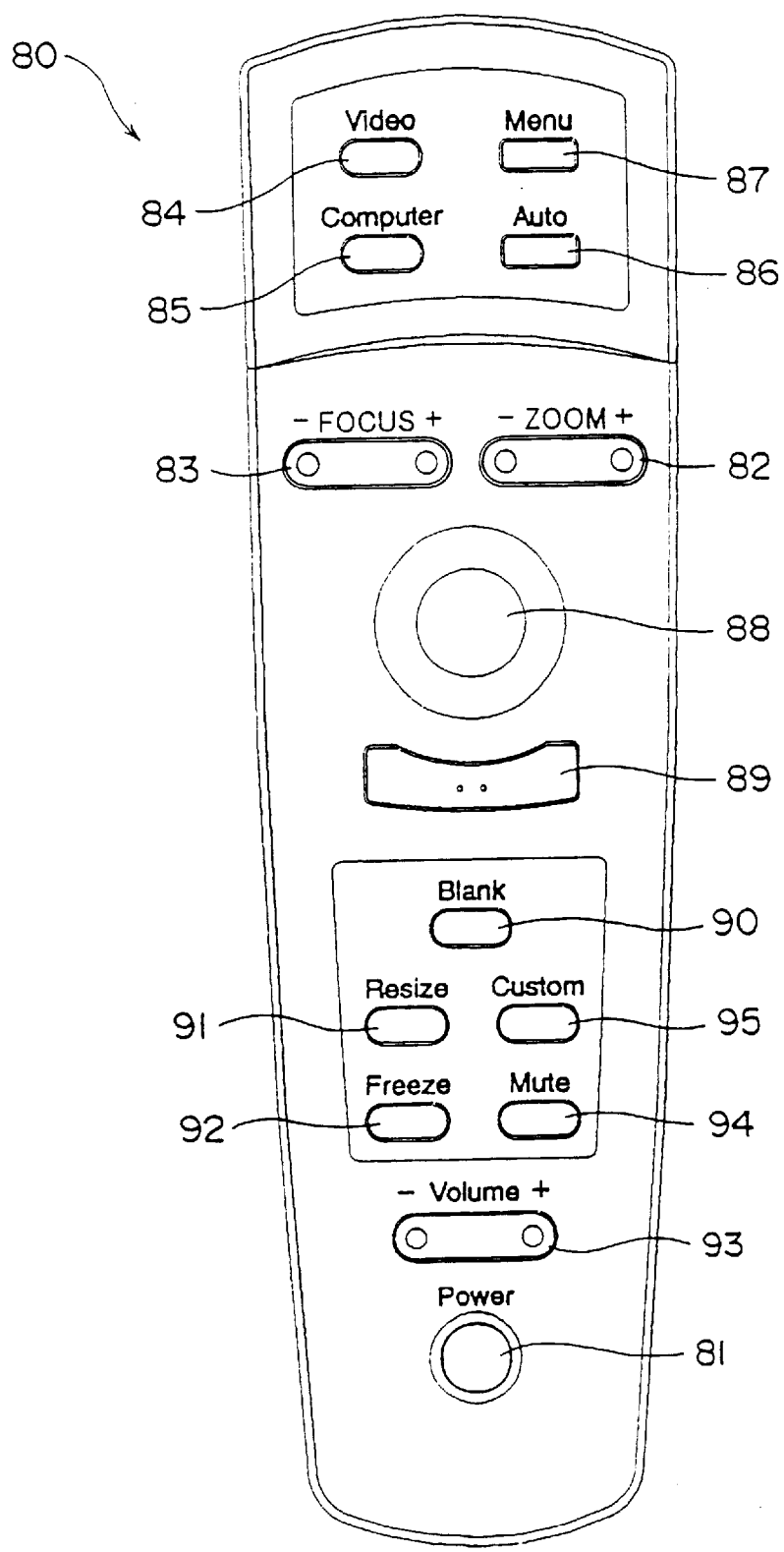
FIG. 9 is a front view of a remote controller of the projection display device of an embodiment in accordance with the present invention.

As shown in FIG. 9, the remote controller 80, for controlling the projection display device 1, has a power supply switching button 81, a zoom adjuster button 82, a focus adjuster button 83, a video switching button 84 and a computer switching button 85, forming an image adjusting portion, and an auto format button 86. The remote controller 80 also has a menu button 87; a pointer operation button 88, for operating the mouse pointer on the screen that appears on the projection surface 100, when an image signal is input from a computer to the projection display device 1; a click button 89; a blank button 90; a re-size button 91, a freeze button 92 for bringing, for example, a video motion picture still; a volume button 93; a mute button 94; and a custom button 95 for calling out CUSTOM SET set at the projection display device 1. The menu button 87, the blank button 90, the re-size button 91, the volume button 93, and the mute button 94 provide essentially the same functions as the corresponding buttons on the body of the projection display device 1.

Although not shown in FIG. 9, these buttons are connected to a conventionally known type of light signal generating circuit accommodated in the remote controller 80. Through the light signal generating circuit, a light signal is output from a light-emitting portion at the top end side face of the remote controller 80 of FIG. 8, in accordance with an instruction produced as a result of pressing one of the aforementioned buttons. The light signal is then received by the light-receiving portion 70 of the projection display device 1, whereby the projection display device 1 is operated without using wires.

In the case where the power supply of the projection display 1 is cut off, pressing the power supply switching button 81 once causes the light source lamp 181 in the light source lamp unit 8 to be turned on, and pressing it again causes it to be turned off. Thereafter, the ventilating fan 16 and the intake fan 17 are operated for a certain period of time in order to clean the inside of the projection display device 1.

By continuously pressing either one of the + side or the − side of the zoom adjuster button 82 and either one of the + side or the − side of the focus adjuster button 83, the zooming or the focusing of the projection lens 6 can be varied continuously. By releasing the buttons 82 or 83 when the predetermined zooming position or focusing position is reached, the zooming adjustment or the focusing adjustment can be stopped. The + and − sides are provided for the zoom adjuster button 82 and for the focus adjuster button 82 so that zooming adjusting operations and focusing adjusting operations can be reversed.

When the video switching button 84 is pressed, an optical image is formed based on the input image signal coming from a video input terminal (not shown) of the projection display device 1 in order to display it on the projection surface 100; and when the computer image button 85 is pressed, an optical image is formed based on the input image signal coming from a RGB terminal of the projection display device 1. The input and output terminal group 50, provided at the aforementioned rear case 5, can be simultaneously connected to a plurality of computers. When the computer image button 85 is pressed a plurality of times, switching between computers, which output image signals, can be performed in accordance with the number of pressing operations.

(7) Power Supply Switch Restricting System, Zooming/Focusing Adjusting Function Restricting System, and Image Adjusting Function Restricting System The projection display device 1 includes a power supply switch restricting system which can restrict the function of the power supply switch button 81 of the remote controller 80; a zooming/focusing function restricting system which can restrict the function of the zoom adjuster button 82 and/or the function of the focus adjuster button 83 of the remote controller 80; and an image adjusting function restricting system which can restrict the function of the video switching button 84, the function of the computer switching button 85, and the function of the auto format button 86 of the remote controller 80. These restricting systems are provided on the circuit board 11, and comprise switching elements interposed between conventionally known types of circuits, used for executing these functions, and the light-receiving portion 70. Switching between restricting states of each of the restricting systems can be performed based on the state of the switching element associated thereto.

(8) Procedure for Switching the Restricting State of Each Restricting System

A description will now be given of the procedure for switching the restricting state of each restricting system of the projection display device 1, using the zoom adjuster button 82 and the focus adjuster button 83 as examples.

Figure 10:
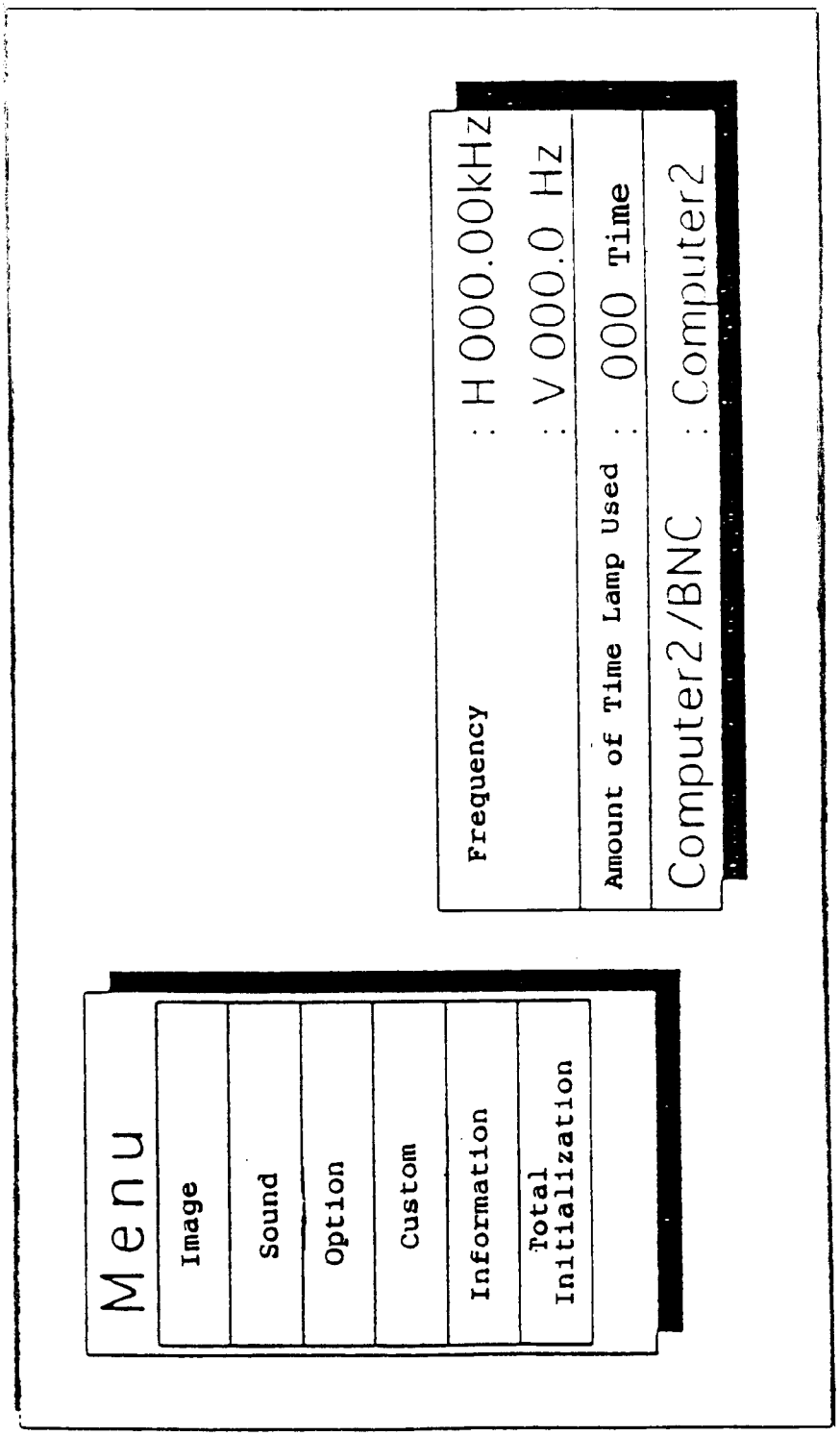
FIG. 10 illustrates a menu displayed on the projection display device of an embodiment in accordance with the present invention.

(a) When the light source lamp 181 of the projection display device 1 is turned on by pressing the body side power supply switch button 61 of the projection display device 1, or when the body side menu button 87 is pressed while the light source lamp 181 is lit, a menu screen for performing various projection display device 1 settings appears, as shown in FIG. 10. As can be seen in FIG. 10, on the menu screen of the present embodiment are also displayed, along with the menu, such information as the horizontal synchronization frequency, the vertical synchronization frequency, the amount of time the light source lamp 181 is used, and the name of the computer which is the origin of the image display currently being shown. It is possible, therefore, to confirm whether or not the image signal, input from a computer or the like, matches the projection display device 1 setting, by looking at the menu screen.

(b) From the menu, CUSTOM is selected, and from the custom setting menu, REMOTE CONTROLLER SETTING is selected. When selecting from the menu, the body side tracking adjusting portion 64 of the projection display device 1 is used. More specifically, vertical movement on the menu screen is achieved by using the V synchronization adjuster buttons 643 and 644, shown in FIG. 8, horizontal movement on the menu screen is achieved by using the tracking adjuster buttons 641 and 642, shown in FIG. 8, and selection from the menu screen is achieved by using the auto format button 645 disposed at the center of the body side tracking adjusting portion 64.

Figure 11:
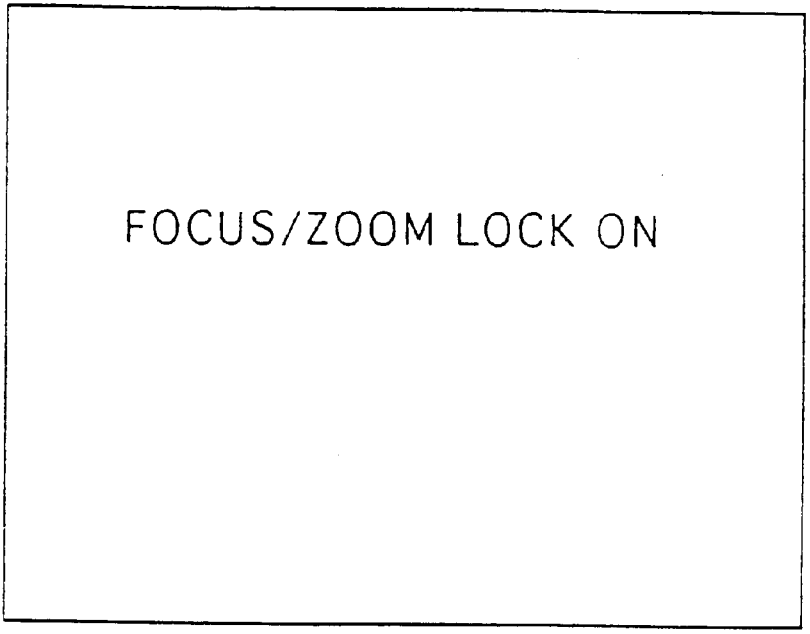
FIG. 11 illustrates a screen used for setting the state of restriction of the function of a zoom adjuster button and the function of a focus adjuster button of a remote controller, in an embodiment of the present invention.
Figure 12:
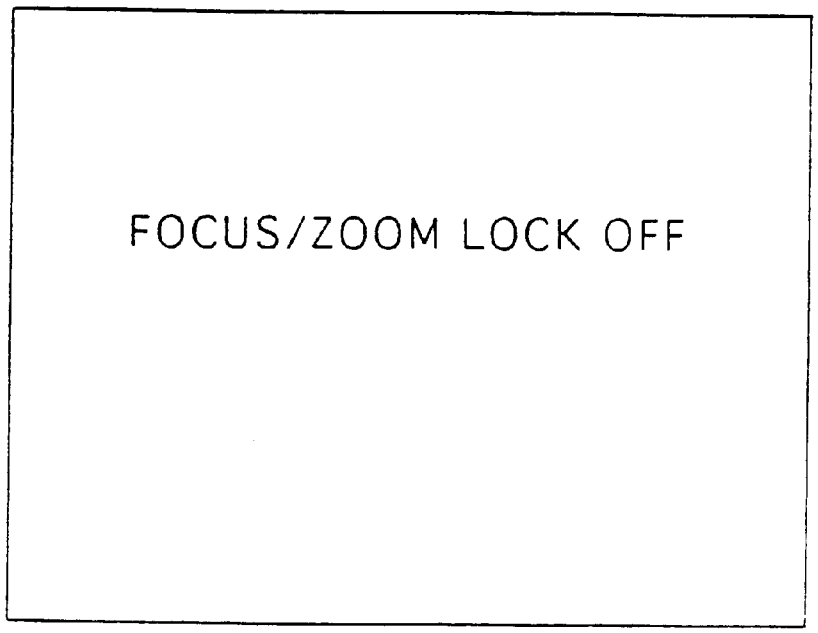
FIG. 12 illustrates a screen used for setting the state of restriction of the function of the zoom adjuster button and the function of a focus adjuster button of the remote controller, in an embodiment of the present invention.

(c) When REMOTE CONTROLLER SETTING is selected, the remote controller 80 setting menu is displayed (not shown). Then, when ZOOM/FOCUS LOCK is selected from this menu, information regarding the lock state of the zooming/focusing adjusting function of the remote controller 80 is displayed, as shown in FIG. 11. When the user wants to lock the zooming/focusing adjusting function of the remote controller 80, by pressing the V synchronization adjuster buttons 643 and 644, the screen is set as shown in FIG. 11. On the other hand, when the user wants to maintain the zoom focus function of the remote controller 80, by operating the V synchronization adjuster buttons 643 and 644, the screen is set as shown in FIG. 12.

(d) Thereafter, when the setting of the remote controller 80 is executed by using the auto format button 644, the screen changes from the REMOTE CONTROLLER SETTING screen to the menu screen. When the body side menu button 66 is pressed, the screen changes to the ordinary display screen based on the image signal from the computer or the like.

(e) FOCUS/ZOOM displayed on the screens of FIGS. 11 and 12 can also be changed, by pressing the tracking adjuster buttons 641, 642, and moving the cursor to the right portion of the screen in FIGS. 11 and 12, and subsequently pressing the V synchronization adjuster buttons 643, 644. More specifically, the information indicating the lock state of the zooming adjusting function/the focusing adjusting function can be displayed in the following three ways: FOCUS/ZOOM (which means that the focusing adjusting function and the zooming adjusting function are both locked), FOCUS (which means only the focusing adjusting function is locked), and ZOOM (which means that only the focusing adjusting function is locked).

(f) In addition to the ZOOM/FOCUS LOCK menu, the POWER SUPPLY SWITCH LOCK menu and the TRACKING/V SYNCHRONIZATION ADJUSTMENT LOCK menu are also provided on the REMOTE CONTROLLER SETTING screen described above. The power supply switch function and the tracking/V synchronization adjusting functions can be locked by the same procedures as those used to lock the focusing adjusting function and the zooming adjusting function. Therefore, the procedures for locking these functions will not be described.

(9) Advantages of the First Embodiment (a) The projection display device 1 is provided with a power supply switch restricting system, a zooming/focusing adjusting function restricting system, and an image adjusting function restricting system. Selections can be made from menus by operating the body side tracking adjusting portion 64, thereby allowing the on/off state of the power supply switch, the zooming adjusting function, the focusing adjusting function, the tracking adjusting function, and the like, of the remote controller 80 to be restricted as required. When the on/off state of the power supply switch, the zooming adjusting function, the focusing adjusting function, and the tracking adjusting function are restricted, the various settings of the projection display device 1 will not be disturbed, even when any one of the adjuster buttons 81 through 87 on the remote controller 80 are inadvertently pressed by the person making a presentation.

(b) By operating the buttons 641 to 645 of the body side tracking adjusting portion 64, various adjusting functions can be restricted by setting ZOOM/FOCUS, ZOOM, or FOCUS, making it possible to easily set the state of restriction of the remote controller 80 from the projection display device 1.

(c) Since the state of restriction of any of the button functions on the remote controller 80 can be switched on the screen, such as at the setting screens shown in FIGS. 10 to 12, the setting of the remote controller 80 can be confirmed by more than one person. In addition, the setting of the remote controller 80 can be changed by pressing the body side menu button 66, the menu button 87, or the like, to call out the setting screen, as required. Therefore, even when there are many people of, for example, an academic society making presentations, the setting of the remote controller can be changed based on the demands of the persons making the presentation.

(10) Structure of the Projection Display Device of the Second Embodiment and Advantages Thereof A description will now be given of the second embodiment of the projection display device in accordance with the present invention. In the following description, similar or corresponding parts to those of the projection display device of the first embodiment are not described.

In the first embodiment, the body of the projection display device 1 is provided with a power supply switch restricting system, a zooming/focusing adjusting function restricting system, and an image adjusting function restricting system.

The second embodiment is different from the first embodiment in respect of that the remote controller is provided with a zooming/focusing adjusting function restricting system, and an image adjusting function restricting system. In addition, in the second embodiment, the remote controller is provided with a body side adjusting function restricting system which restricts the functions of the operation buttons provided at the body.

The structure of the body of the projection display device of the second embodiment is similar to that of the body of the projection display device of the first embodiment of FIGS. 1 to 8, so that it will not be described below.

Figure 13:
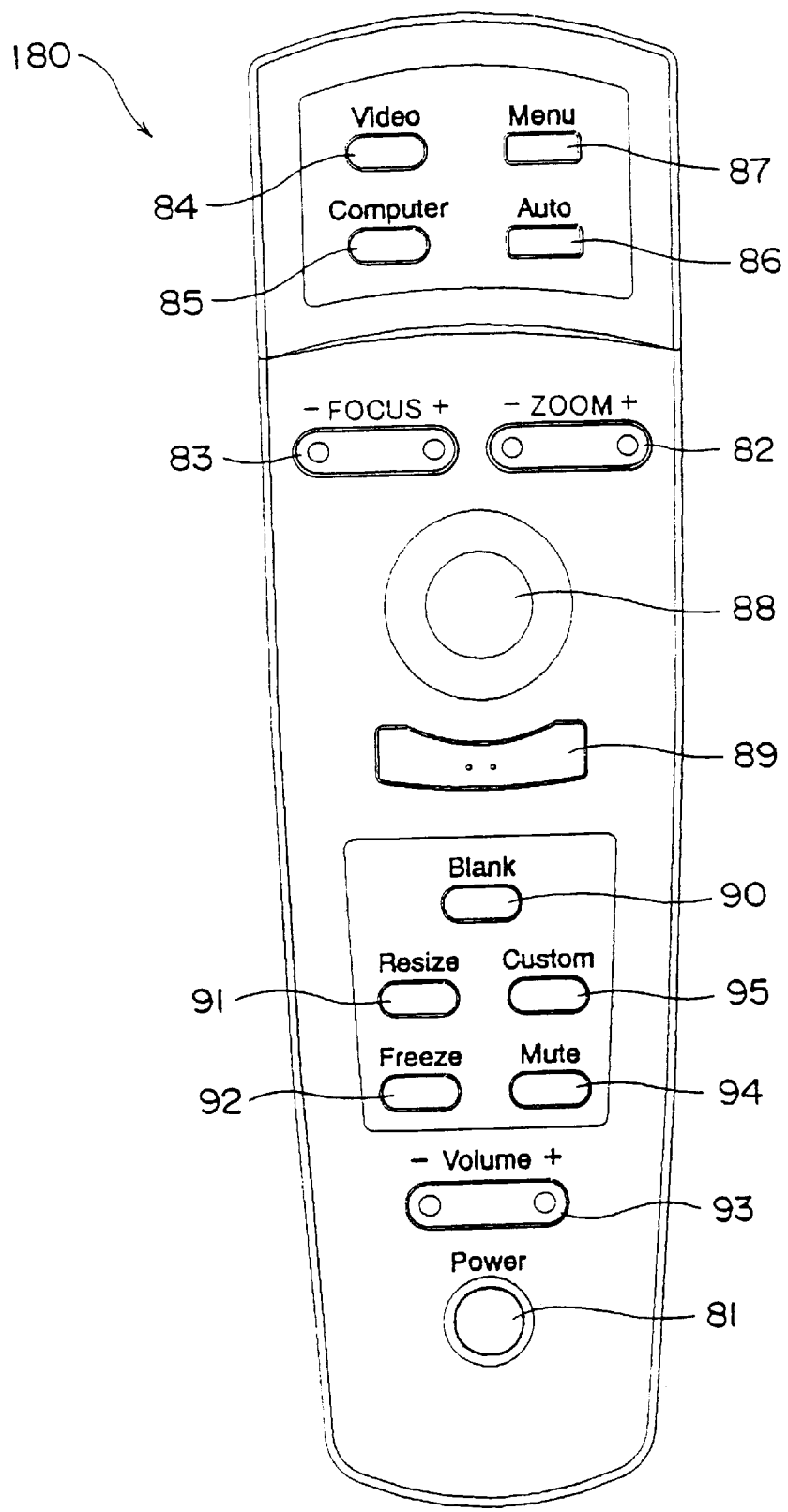
FIG. 13 is a front view of a remote controller, relative to a second embodiment of the present invention.

As shown in FIG. 13, the remote controller 180 used to control the body of the projection display device of the second embodiment is essentially the same as the remote controller 80 used for controlling the projection display device 1 body of the first embodiment.

Although not shown in FIG. 13, the remote controller 180 is provided with a power supply switch restricting system for restricting the function of the power supply switch button 81; a zooming/focusing adjusting function restricting system for restricting the function of a zoom adjuster button 82 and/or the function of a focus adjuster button 83; an image adjusting function restricting system for restricting the function of computer switching buttons 84 and 85 and the function of an auto format button 86; and a body side adjusting function restricting system for restricting the adjusting functions of all of the buttons of the operation switch on the projection display device. These restricting systems are provided on a circuit board disposed in the remote controller 180. The body side adjusting function restricting system is formed including a light signal outputting circuit for outputting two types of signals used to switch the state of restriction of the body side adjusting functions, while the restricting systems other than the body side adjusting function restricting system is formed by a circuit including a switching element disposed between circuits of a conventionally known type, used to provide the various button functions, and the light signal outputting circuit.

The restricting state of any one of the restricting systems can be switched by the remote controller 180 by the same switching procedures used to switch the restricting state of each of the restricting systems in the first embodiment. However, since the switching of the restricting state is performed using the remote controller 180, the types of buttons to be operated are slightly different. More specifically, when selecting from a menu using the remote controller 180, a pointer operation button 88 is pressed to select the section to be changed, and, then, a click button 89 is clicked once to display the settable patterns at the section of the menu. After moving the cursor to the desired pattern by pressing the pointer operation button 88 once again, the click button 89 is clicked to set the desired pattern. Thereafter, procedures which are substantially the same as the switching procedures carried out in the first embodiment are performed to change the restricting state of any one of the restricting systems including the body side adjusting function restricting system. It is to be noted that the state of restriction of the body side adjusting functions can be changed by selecting BODY SIDE ADJUSTING FUNCTION SET from the custom setting menu of the menu screen.

In addition to the advantages of the projection display device of the first embodiment, the projection display device of the second embodiment has the following advantages.

(d) The remote controller 180 is provided with a body side adjusting function restricting system which can restrict the adjusting function of the buttons of the operation switch at the body of the projection display device. Therefore, with the body side buttons of the operation switch locked, when a presenter makes a presentation while adjusting the display screen using the remote controller 180, the display screen remains, for example, correctly zoomed and focused, even when an outsider incorrectly operates any of the body side buttons of the operation switch.

(11) Modifications

The present invention is not limited to the above-described embodiments, so that various modifications can be made.

Although in the first embodiment, the restricting state of the power supply switch restricting system, the zooming/focusing adjusting function restricting system, and the image adjusting function restricting system are switched at the menu setting screen shown in FIGS. 10 to 12, the function restricting state may be switched by providing a switch on the projection display device 1, which is designed specifically for switching the restricting state of the restricting systems. The restricting state may also be switched by simultaneously operating the adjuster buttons 61 to 69 of the operation switch 60 on the projection display device 1.

Although a plurality of switches may be specifically designed in correspondence with the different restricting systems, it is preferable to provide one switch, for switching a function restricting state, on the projection display device, and using this switch in combination with any of the other adjuster buttons on the projection display device, such as the power supply switch button, the focus adjuster button, the zoom adjuster button, or the auto format button, in order to switch the function restricting state of each of the restricting systems.

An example of the case that the adjuster buttons 61 to 69 of the operation switch 60 is operated at the same time is described as follows. When the restricting state of the zooming/focusing adjusting function restricting system is changed, the zoom adjuster button 82 and the focus adjuster button 83 of the remote controller 80 can be locked by pressing at the same time the body side zooming adjuster button 62 or the body side focusing adjuster button 63, as well as the body side volume button 691 and the mute button 692.

When a switch designed specifically for changing the function restricting state of each restricting systems is provided at the projection display device, and the restricting state of the remote controller is set at the projection display device, it is possible to make this restricting state not to be subsequently switched by the remote controller, so that even when the remote controller is used by a large and an unspecified number of users in, for example, presentations given by an academic society, confusion will not arise from accidental changes made in the restricting state.

When the restricting state of the zooming/focusing adjusting function restricting system is switched by operating at the same time the body side zoom adjuster button 62 or the body side focus adjuster button 63 and the adjuster buttons 691 and 692, the projection display device 1 does not require a separate switch specifically designed for changing the restricting state, making it possible to simplify the structure of the projection display device 1. In addition, the restricting state can be switched by simply operating at the same time the body side zoom adjuster button 82 or the body side focus adjuster button 83 and the adjuster buttons 691 and 692, so that the procedure of calling out the setting menu and changing the setting of the remote controller can be eliminated, thereby allowing the restricting state to be switched quickly. Further, the instruction for switching the state of restriction of the zooming adjusting function and/or the focusing adjusting function is not displayed at the projection display device 1, the state of restriction can be switched by using such as hidden commands, so that even when the remote controller 80 is used by a large and an unspecified number of users, the restricting state cannot be easily changed. Therefore, when the projection display device 1 is used at, for example, an exhibition, and someone plays around with the remote controller 80, the information or image of the projection display device 1 will remain properly zoomed and focused.

Figure 14:
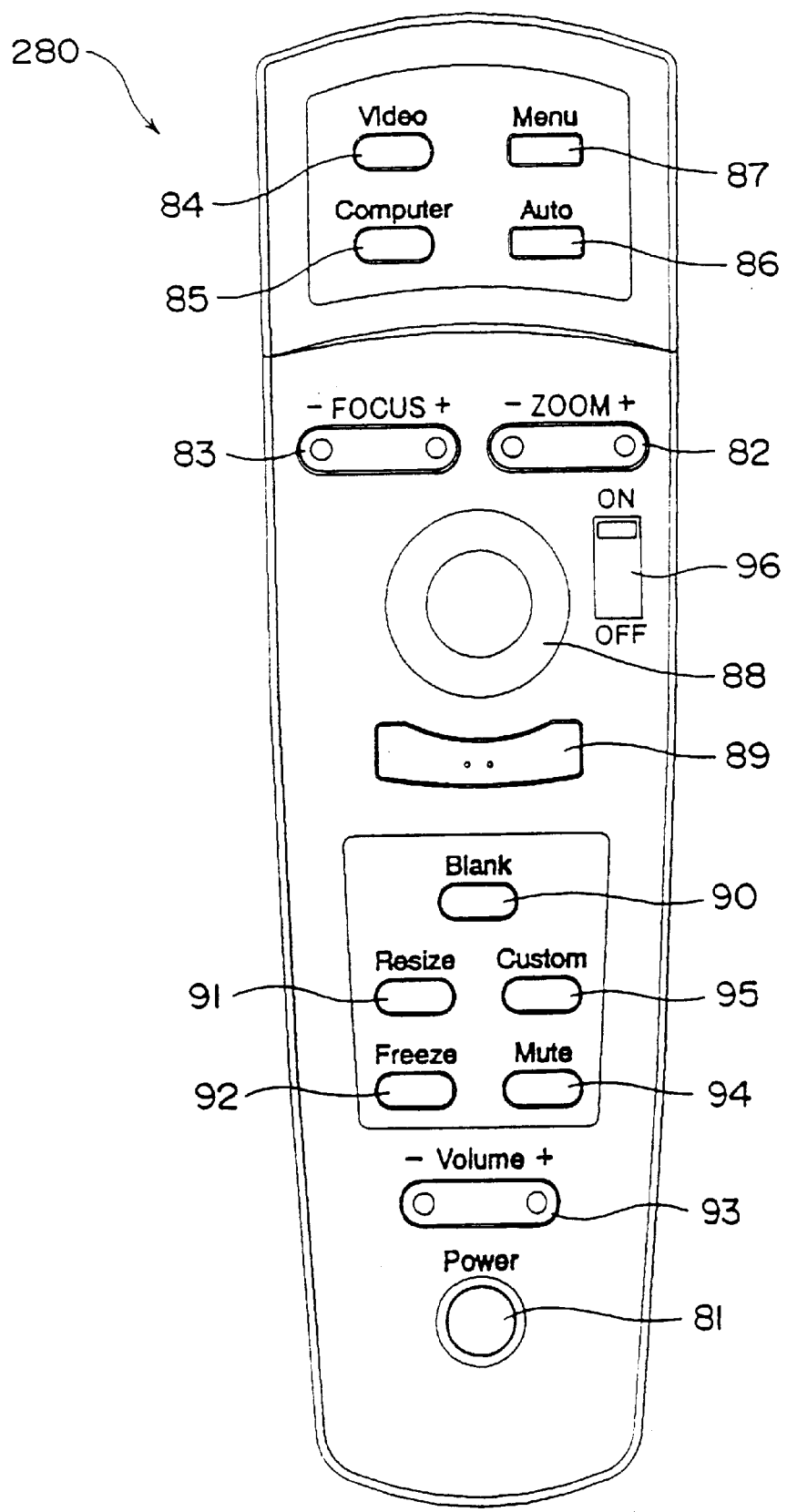
FIG. 14 is a front view of a remote controller, which is a modification of the remote controller described in the second embodiment of the present invention.

Although in the second embodiment, the restricting state of the power switch restricting system, the restricting state of the zooming/focusing adjusting function restricting system, the restricting state of the image adjusting function restricting system, and the restricting state of the body side adjusting function restricting system are switched at the menu setting screen, the restricting state of any one of the systems can be switched by a specifically designed switch 96 that is provided on the remote controller 280, shown in FIG. 14. The specifically designed switch 96 is used in combination with the adjuster buttons 81 to 95 of the remote controller 280 in order to change the restricting state. For example, when the state of restriction of the zoom adjuster button 82 is to be switched, the specifically designed switch 96 is operated while pressing the zoom adjuster button 82.

Since the restricting state of the remote controller 280 can be changed using the specifically designed switch 96, anyone making a presentation can easily change the restricting state whenever it is necessary even during the presentation.

In addition to selecting from a menu screen and using the specifically designed switch 96 shown in FIG. 12, the restricting state of any one of the restricting systems can be changed by operating at the same time some of the adjuster buttons 81 to 95 of the remote controller 180. When the restricting state is changed is this way, operational effects that are similar to those obtained when the body side adjuster buttons are operated at the same time can be obtained. The structures and forms are not limited to those described in the embodiments above, so that other structures and forms may be used within the scope that allows the object of the present invention to be achieved.

What is claimed is:

1. A projection display device controllable by a remote controller having a power supply switch portion, the projection display device including a light source, an optical system for forming an optical image in accordance with image information as a result of optically processing light beams emitted from the light source, and a projection lens for projecting the optical image in enlarged form, the projection display device comprising:

a power supply switch restricting system that includes at least one switching element having one setting which restricts a function of the power supply switch portion of the remote controller which causes a power supply to be turned on/off and another setting which does not restrict a function of the power supply switch portion.

2. The projection display device according to claim 1, further comprising a setting screen displaying system for displaying a setting screen used for setting the projection display device, switching between restricting states of the power supply switch restricting system being performable by selecting from a setting menu on the setting screen.

3. The projection display device according to claim 1, further comprising a switch specifically designed for switching between restricting states of the power supply switch restricting system.

4. A projection display device controllable by a remote controller, the projection display device including a light source, an optical system for forming an optical image in accordance with image information as a result of optically processing light beams emitted from the light source, and a projection lens for projecting the optical image in enlarged form, the projection display device comprising:

a zooming adjusting portion for performing zooming adjustments on the projection lens;

a focusing adjusting portion for performing focusing adjustments on the projection lens; and a zooming/focusing adjusting function restricting system that includes at least one switching element having one setting which performs at least one of restricting a function of the zooming adjusting portion and restricting a function of the focusing adjusting portion and another setting which does not perform at least one of restricting a function of the zooming adjusting portion and restricting a function of the focusing adjusting portion.

5. The projection display device according to claim 4, further comprising a setting screen displaying system for displaying a setting screen used for setting the projection display device, switching between restricting states of the zooming/focusing adjusting function restricting system being performable by selecting from a setting menu on the setting screen.

6. The projection display device according to claim 4, further comprising a body side zooming adjusting portion and a body side focusing adjusting portion;

switching between restricting states of the zooming/focusing adjusting function restricting system being performable by operating the body side zooming adjusting portion or the body side focusing adjusting portion and another adjusting portion at the same time.

7. The projection display device according to claim 4, further comprising a switch specifically designed for switching between restricting states of the zooming/focusing adjusting function restricting system.

8. A projection display device controllable by a remote controller having an image adjusting portion, the projection display device including a light source, an optical system for forming an optical image in accordance with image information as a result of optically processing light beams emitted from the light source, and a projection lens for projecting the optical image in enlarged form, the projection display device comprising:

an image adjusting function restricting system that includes at least one switching element having one setting which restricts a function of the image adjusting portion of the remote controller for adjusting the optical image and another setting which does not restrict a function of the image adjusting portion.

9. The projection display device according to claim 8, further comprising a setting screen displaying system for displaying a setting screen used for setting the projection display device, switching between restricting states of the image adjusting function restricting system being performable by selecting from a setting menu on the setting screen.

10. The projection display device according to claim 8, further comprising a switch specifically designed for switching between restricting states of the image adjusting function restricting system.

11. A remote controller for controlling a body of a projection display device, the projection display device including a light source, an optical system for forming an optical image in accordance with image information as a result of optically processing light beams emitted from the light source, and a projection lens for projecting the optical image in enlarged form, the remote controller comprising:

a power supply switch portion for turning on/off a power supply of the projection display device; and a power supply switch restricting system that includes at least one switching element having one setting which restricts a function of the power supply switch portion and another setting which does not restrict a function of the power supply switch portion.

12. The remote controller according to claim 11, the body of the projection display device comprising a setting screen displaying system for displaying a setting screen used for setting the body of the projection display device and, switching between restricting states of the power supply switch restricting system being performable by selecting from a setting menu on the setting screen.

13. The remote controller according to claim 11, further comprising a switch specifically designed for switching between restricting states of the power supply switch restricting system.

14. A remote controller for controlling a body of a projection display device, the projection display device including a light source, an optical system for forming an optical image in accordance with image information as a result of optically processing light beams emitted from the light source, and a projection lens for projecting the optical image in enlarged form, the remote controller comprising:

a zooming adjusting portion for performing zooming adjustments on the projection lens, a focusing adjusting portion for performing focusing adjustments on the projection lens, and a zooming/focusing adjusting function restricting system that includes at least one switching element having one setting which performs at least one of restricting a function of the zooming adjusting portion and a function of the focusing adjusting portion and another setting which does not restrict at least one of a function of the zooming adjusting portion and a function of the focusing adjusting portion.

15. The remote controller according to claim 14, the body of the projection display device comprising a setting screen displaying system for displaying a setting screen used for setting the projection display device, and switching between restricting states of the zooming/focusing adjusting function restricting system being performable by selecting from a setting menu on the setting screen.

16. The remote controller according to claim 14, switching between restricting states of the zooming/focusing adjusting function restricting system being performable by operating the zooming adjusting portion or the focusing adjusting portion and another adjusting portion at the same time.

17. The remote controller according to claim 14, further comprising a switch specifically designed for switching between restricting states of the zooming/focusing adjusting function restricting system.

18. A remote controller for controlling a body of a projection display device, the projection display device including a light source, an optical system for forming an optical image in accordance with image information as a result of optically processing light beams emitted from the light source, and a projection lens for projecting the optical image in enlarged form, the remote controller comprising:

an image adjusting portion for adjusting the optical image; and an image adjusting function restricting system that includes at least one switching element having one setting which restricts a function of the image adjusting portion and another setting which does not restrict a function of the image adjusting portion.

19. The remote controller according to claim 18, the body of the projection display device comprising a setting screen displaying system for displaying a setting screen used for setting the projection display device, and switching between restricting states of the image adjusting function restricting system being performable by selecting from a setting menu on the setting screen.

20. The remote controller according to claim 18, further comprising a switch specifically designed for switching between restricting states of the image adjusting function restricting system.

21. A remote controller for controlling a body of a projection display device, the projection display device comprising a light source, an optical system for forming an optical image in accordance with image information as a result of optically processing light beams emitted from the light source, and a projection lens for projecting the optical image in enlarged form, the body of the projection display device comprising:

a body side power supply switch portion for turning on/off a power supply of the body of the projection display device;

a body side zooming adjusting portion for performing zooming adjustments on the projection lens;

a body side focusing adjusting portion for performing focusing adjustments on the projection lens; and a body side image adjusting portion for adjusting the optical image, the remote controller comprising a body side adjusting function restricting system that includes at least one switching element having one setting which restricts the adjusting function of at least one of the body side power supply switch portion, the body side zooming adjusting portion, the body side focusing adjusting portion, and the body side image adjusting portion and another setting which does not restrict the adjusting function of at least one of the body side power supply switch portion, the body side zooming adjusting portion, the body side focusing adjusting portion, and the body side image adjusting portion.

22. The remote controller according to claim 21, the body of the projection display device comprising a setting screen displaying system for displaying a setting screen used for setting of the projection display device, and switching between restricting states of the body side adjusting function restricting system being performable by selecting from a setting menu on the setting screen.

23. The remote controller according to claim 21, further comprising a switch specifically designed for switching between restricting states of the body side adjusting function restricting system.

* * * * *